United States Patent [19]
Jarosch

[11] Patent Number: 5,218,836
[45] Date of Patent: Jun. 15, 1993

[54] MEASURING EVAPORATOR LOAD IN AN AUTOMOTIVE AIR CONDITIONING SYSTEM FOR COMPRESSOR CLUTCH CONTROL USING EVAPORATOR INLET TEMPERATURE

[75] Inventor: George W. Jarosch, Elk Grove, Ill.

[73] Assignee: Eaton Corporation, Cleveland, Ohio

[21] Appl. No.: 896,947

[22] Filed: Jun. 11, 1992

[51] Int. Cl.$^5$ .............................................. F25B 1/00
[52] U.S. Cl. ..................................... 62/227; 62/157
[58] Field of Search ................ 62/227, 323.4, 226, 62/228.3, 231, 157, 228.1

[56] References Cited
U.S. PATENT DOCUMENTS
4,856,293  8/1989  Takahashi ..................... 62/227 X
5,117,646  6/1992  Nose et al. ..................... 62/227 X Primary Examiner—Harry B. Tanner
Attorney, Agent, or Firm—R. A. Johnston

[57] ABSTRACT

An electronic controller receives an evaporator inlet (or outlet) temperature sensor signal and measures the time required for the evaporator to be heated from compressor clutch cut-out to compressor clutch "ON". Depending upon the elapsed time, the controller selects from a predetermined schedule, a new value CLHOFF of the evaporator inlet temperature at which the compressor is next cut-out, raising CLHOFF for lighter thermal loading to prevent evaporator icing and freeze-up and lowering CLHOFF for heavy thermal loading to prevent unwanted compressor cycling.

3 Claims, 2 Drawing Sheets

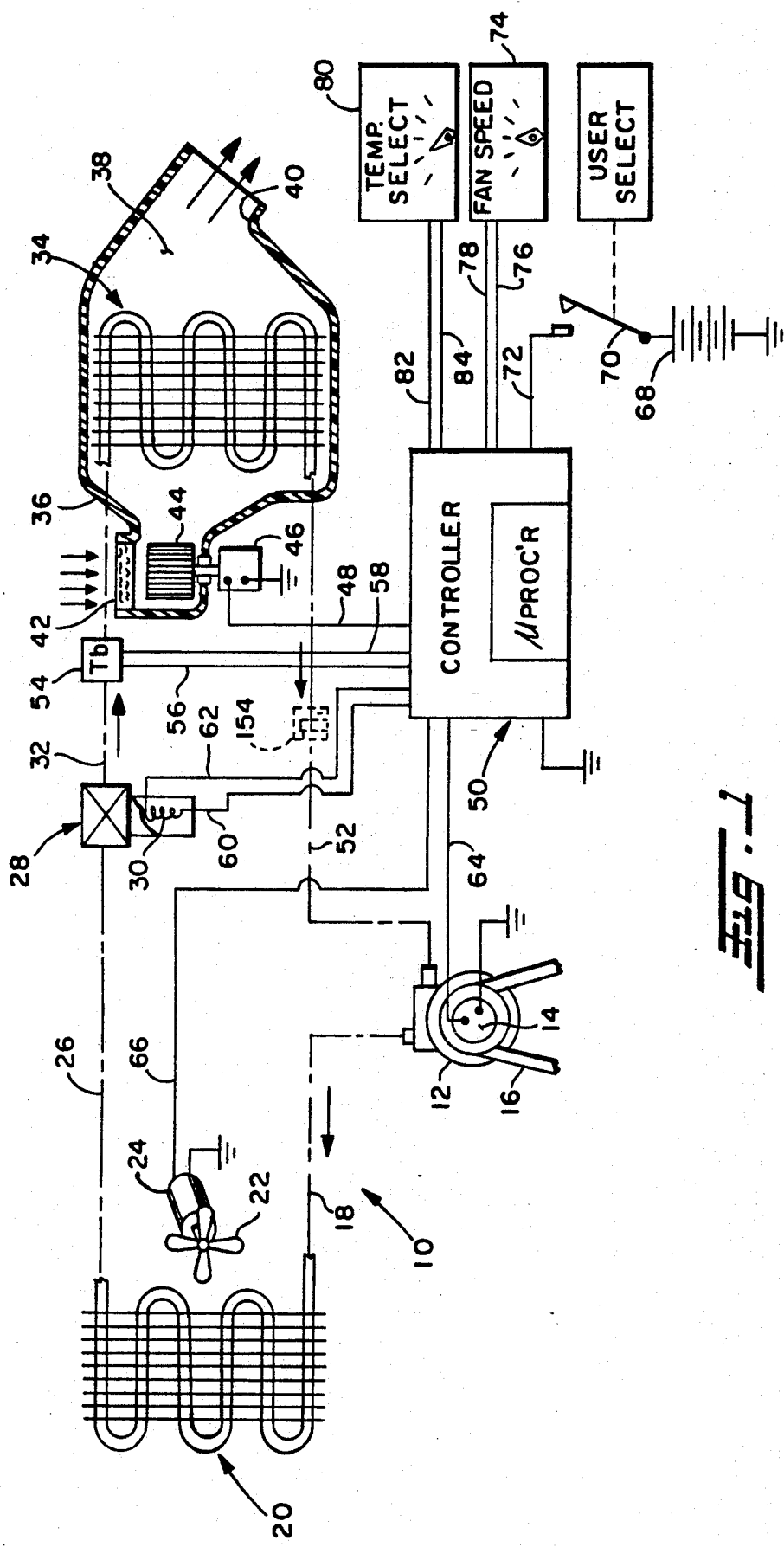

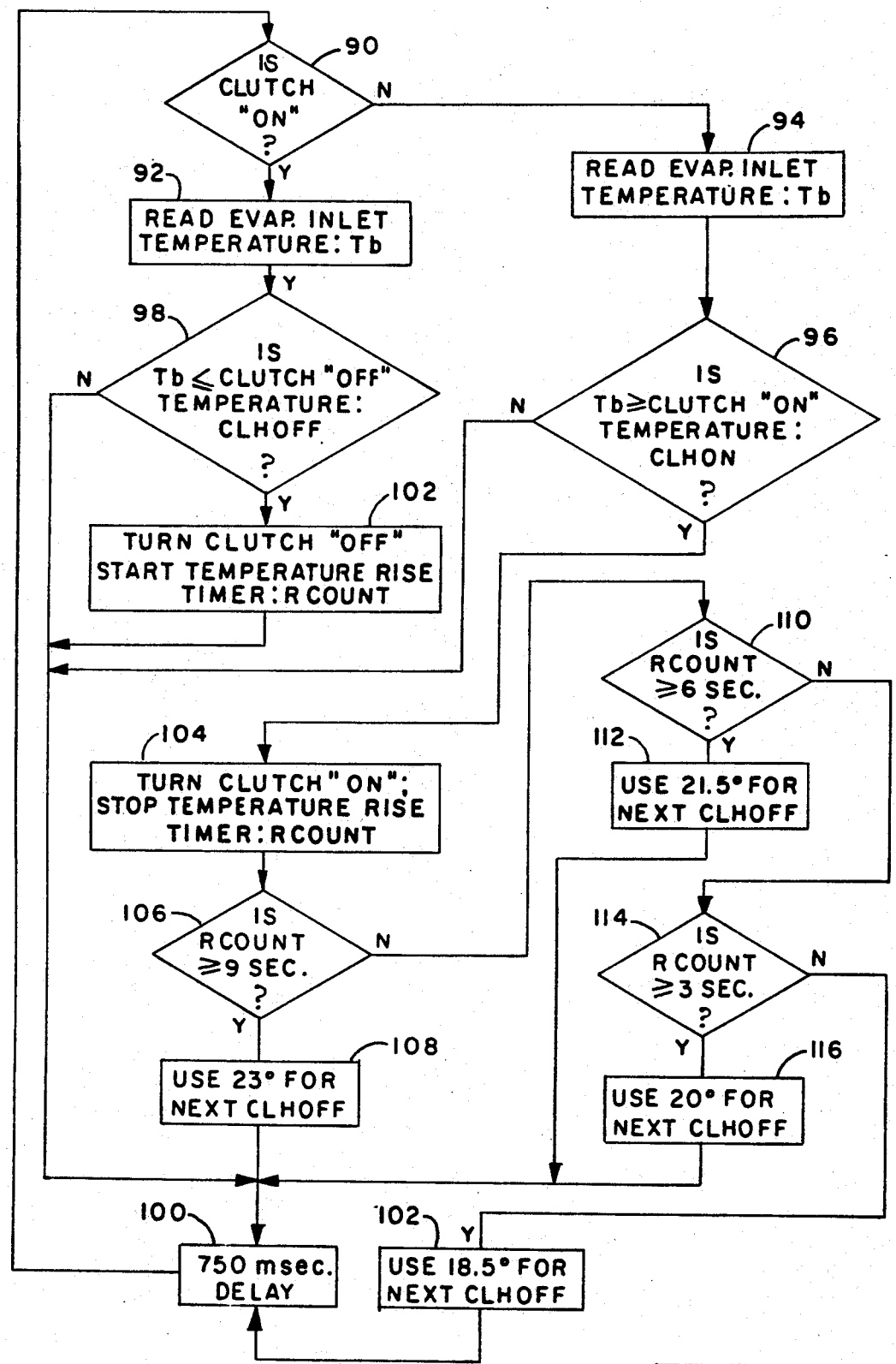

MEASURING EVAPORATOR LOAD IN AN AUTOMOTIVE AIR CONDITIONING SYSTEM FOR COMPRESSOR CLUTCH CONTROL USING EVAPORATOR INLET TEMPERATURE

CROSS REFERENCE TO RELATED APPLICATION

This application is related to my co-pending application Ser. No. 838,513, filed Feb. 19, 1992, and entitled "MEASURING EVAPORATOR LOAD IN AN AUTOMOTIVE AIR CONDITIONING SYSTEM FOR COMPRESSOR CLUTCH CONTROL."

BACKGROUND OF THE INVENTION

The present invention relates to refrigeration systems and particularly refrigeration systems employed for air conditioning or climate control of the passenger compartment of an automotive vehicle. Automotive air conditioning systems typically employ an evaporator with a flow of blower air discharged over the evaporator into the passenger compartment for cooling. Refrigerant flow to the evaporator is through an expansion device or valve and is typically controlled by cycling an electric clutch for engaging the drive to the compressor.

Various expansion means may be employed to supply the refrigerant to the evaporator at a reduced pressure from the condenser. One known technique employs a simple capillary tube; the second known technique employs an expansion means in the form of a mechanically operated thermal expansion valve. Such valves typically have a diaphragm responsive to changes in pressure in a closed chamber filled with refrigerant which is exposed to the temperature of the refrigerant discharging from the evaporator. Changes in refrigerant temperature produce a change in pressure forces acting on the diaphragm, which effects movement of a member for controlling flow through the valve. A third known type of expansion means comprises an electrically operated valve typically having a solenoid controlled by an electronic controller utilizing a micro-computer for either proportional movement or modulated pulse movement. All of these techniques are known; examples of vehicle air conditioning systems controlled by mechanical expansion valves are shown in U.S. Pat. Nos. 4,794,762, 4,841,734, and 4,944,160. Examples of automotive air conditioning systems controlled by electrically operated expansion valves are shown and described in U.S. Pat. Nos. 4,790,145, 4,835,976, 4,835,976, 4,848,100, and 4,873,836.

In such systems where an expansion valve is employed for controlling refrigerant flow to the evaporator, it is known to sense the evaporator inlet temperature and to provide an electrical signal indicative thereof to an electronic controller for generating a signal to cut off the compressor clutch when the evaporator inlet temperature falls below a predetermined level. In systems of this latter type, when the thermal load on the evaporator is high, e.g., when the interior of the vehicle is very hot, it is desirable to run the evaporator as cold as possible to effect a maximum rate of cool down for the passenger compartment. Under such conditions, it is desired to maintain the compressor energized or operable on an uninterrupted basis so long as there is no likelihood of condensate freezing and ice formation on the exterior of the evaporator. Under conditions of high thermal load, it is undesirable to cycle the compressor "OFF" because of the attendant rise in the temperature of blower air flowing over the evaporator which reduces the rate of cooling of the passenger compartment interior.

However, if the compressor is allowed to run continuously and the evaporator is maintained as cold as possible under conditions of moderate thermal loading, ice may from on the evaporator fins blocking off air flow, resulting in evaporator freeze-up. Thus, the compressor clutch must be cycled "OFF" before freeze-up occurs.

Heretofore, in air conditioning systems employing expansion valves and particularly systems having electrically operated expansion valves operated by an electronic controller, the evaporator inlet temperature sensor provides a signal to the controller which cycles the compressor clutch "OFF" when the evaporator inlet temperature drops below a predetermined level.

However, it has been found that under maximum thermal loading conditions it is desirable to provide a lower evaporator inlet temperature cut-out setting for the compressor clutch. Therefore, it has been desired to find some way or means of controlling the compressor clutch in order to effect maximum cool-down under high thermal load conditions, yet to prevent evaporator freeze-up during moderate or low thermal load conditions.

SUMMARY OF THE INVENTION

The present invention provides an electronic controller employing a micro-computer which is programmed to override the normal compressor clutch cut-out control based upon evaporator inlet temperature. The rate of rise of evaporator inlet temperature with the compressor off is measured; and, evaporator inlet temperature level at which the compressor cuts out is adjusted or decremented according to a predetermined schedule when the rate of rise is rapid enough to indicate heavy thermal loading. This prevents evaporator icing and freeze-up under moderate thermal load conditions, yet avoids unnecessary compressor cycling under heavy thermal loading.

BRIEF DESCRIPTION OF THE DRAWINGS

FIG. 1 is a schematic of the present invention as embodied in an automotive air conditioning system; and, FIG. 2 is a block flow diagram of the program for the controller of the system of FIG. 1.

DETAILED DESCRIPTION

Referring to FIG. 1, a refrigeration or air conditioning system is indicated generally at 10, and is illustrated as applied to automotive air conditioning having a compressor 12 connected to a source of power by an electrically operated clutch 14 driven by power transmission belt 16, which is typically connected to the engine crankshaft (now shown). Pressurized refrigerant from compressor 12 is discharged at relatively high pressure through conduit 18 to a condenser indicated generally at 20, which is typically cooled by ambient ram air as augmented at low speed by a fan 22 powered by a fan motor 24.

Condensed refrigerant from condenser 20 is discharged through conduit 26 to the inlet of an electrically operated expansion valve indicated generally at 28 which is typically powered by a solenoid coil 30. The valve 28 discharged liquid refrigerant at a substantially reduced pressure along conduit 32 to the inlet of an evaporator indicated generally at 34. The evaporator is disposed in a blower housing 36 which has a plenum chamber 38 which discharges air through outlet 40 to the passenger compartment of a vehicle.

The blower housing has a filtered air inlet 42 and a blower 44 disposed therein. Blower 44 is shaft-connected through the wall of blower housing 36 to a blower motor 46, which receives power along lead 48 from a controller, indicated generally at 50, with the opposite side of the motor grounded to the common vehicle ground.

The evaporator discharges superheated refrigerant along conduit 52, which is connected to the suction return or inlet of compressor 12. A temperature sensor 54 is disposed to sense the temperature of the refrigerant preferably entering the evaporator. However, it will be understood that the sensor 54 may be alternately located at the evaporator outlet if it is used only for evaporator temperature rise measurement. The alternate location is shown in dashed outline and denoted by reference numeral 154. Sensor 54 is connected via leads 56,58 to the controller 50.

Expansion valve 28 as shown in FIG. 1 is of the electric type and has the solenoid coil 30 thereof connected via leads 60,62 to receive a control signal, such as a pulse width modulated signal for a fractional duty cycle "ON" time, from the controller 50. Although an electric valve 28 is illustrated in FIG. 1, it will be understood that the invention may also be used with a mechanical thermal expansion valve of the type well known in the art. The controller also provides a power to the compressor clutch 14 along lead 64, with the other side of the clutch oil grounded. The controller also provides power to condenser fan motor 24 along lead 66; and, the other side of motor 24 is grounded. The controller is powered from the vehicle battery supply 68 by User Select switch 70 through power lead 72.

The evaporator blower fan motor 46 is controlled by user operator Fan Speed control 74 which is connected to the controller along lead 76,78. If desired, however, control 74 may operate fan 74 directly. A user Temperature Select control 80 also provides an input to the controller along leads 82,84.

The Temperature Select control is utilized, as is known in the art, to provide user input to the system of a desired temperature level or change in temperature level for the passenger compartment.

Referring to FIG. 2, the controller 50 makes a determination at step 90 as to whether the compressor clutch 14 is energized or "ON" and if this is the case, the system proceeds to step 92 and reads the evaporator inlet temperature $T_b$. If the determination at step 90 is in the negative, the system proceeds to step 94 to read evaporator inlet temperature $T_b$ and then proceeds to step 96 to make a determination as to whether the evaporator inlet temperature is equal to or greater than the clutch energization or "ON" temperature: CLHON.

At step 92, the system proceeds directly to step 98, where a determination is made as to whether the evaporator inlet temperature $T_b$ is equal to less then de-energization temperature: CLHOFF. If this determination at step 98 is in the negative, the system proceeds directly to step 100 for a delay of about 750 milliseconds before returning to step 90. However, if the determination at step 98 is affirmative, the system proceeds to step 102 to de-energize the clutch or turn the clutch "OFF" and starts the temperature rise timer: RCOUNT and then proceeds directly to step 100.

Returning to step 96, if the determination is in the negative, the system proceeds directly to step 100. However, if the determination at step 96 is affirmative, the system proceeds to step 104 and energizes the clutch or turns the clutch "ON" and stops the temperature rise timer: RCOUNT. The system then makes a determination at step 106 as to whether RCOUNT is equal to or grater than 9 seconds, and if this is the case, the controller proceeds to step 108 to use 23° F. for the next CLHOFF or value of $T_b$ at which the compressor clutch is de-energized. The system then proceeds to step 100.

If the determination at step 106 is in the negative, the controller proceeds to step 110 and asks the question whether RCOUNT is equal to or greater than 6 seconds; and, if the question is answered in the affirmative, the system proceeds to step 112 and uses 21.5° for the next CLHOFF or value of $T_b$ at which the compressor is de-energized, then proceeds to step 100. If the determination at step 110 is negative, the controller proceeds to step 114 and asks the question whether RCOUNT is equal to or greater than 3. If this question is answered in the affirmative, the system proceeds to step 116 and uses 20° F. as the next CLHOFF or value of $T_b$ at which the compressor is de-energized, then proceeds to step 100.

If determination at step 114 is in the negative, the system controller proceeds to step 120. At step 120, the system uses 18.5° F. for the next CLHOFF or value of $T_b$ for de-energizing the compressor and then proceeds to step 100.

It will thus be seen from the diagram of FIG. 2 that the controller of the present invention determines the time for the evaporator inlet temperature to rise from the compressor cut-off value to the compressor energization value and, dependent upon the duration of this time, selects a new evaporator inlet temperature value for the next compressor cut-off. If the rate of temperature rise is rapid in the evaporator during compressor cut-out, a heavy thermal load is indicated and the system drops the compressor cut-off point further than normal to permit longer compressor runs without encountering any icing. However in the event that the thermal loading on the evaporator is moderate or light, and that a substantially longer time elapses between the cut-off and re-energization of the compressor, the system controller selects a higher value of evaporator inlet temperature for compressor cut-off to prevent ice formation on the evaporator.

The present invention thus provides a convenient technique for maximizing compressor runs during periods of heavy thermal loading in an automotive air conditioning system and yet modifies the temperature cut-off point for conditions of low thermal loading to prevent the wrong compressor load from resulting in icing and freeze-up of the evaporator.

It will be understood that the particular values of the compressor clutch energization and de-energization are chosen in accordance with the requirements of the particular system, that the values of $T_b$ described in FIG. 2 are typical for an automotive air conditioning system operating with an evaporator having a pressure drop from inlet to outlet on the order of 7 PSIG (48.3 KPa).

Although the invention has hereinabove been described with respect to the illustrated embodiments, it will be understood that the invention is cable of modification and variation, and is limited only by the following claims .

We claim:

1. A method of controlling refrigerant flow in a refrigerant system of the type having an energizable and de-energizable pump for circulating refrigerant through a condenser, an expression valve, an evaporator and return to the pump comprising:
   (a) sensing the temperature $T_b$ at of one the evaporator inlet and the evaporator outlet;
   (b) de-energizing said pump when $T_b$ falls below a first predetermined level CLHOFF and energizing said pump when $T_b$ rises above a second predetermined level CLHON;
   (c) counting the time RCOUNT elapsed from when $T_b$ rises from CLHOFF to CLHON and varying CLHOFF in accordance with a predetermined schedule of change in RCOUNT.

2. The method defined in claim 1, further comprising: delaying a predetermined time interval and repeating steps (a)–(c).

3. The method defined in claim 1, wherein said step of varying comprises decrementing CLHOFF by 1.5° F. for each 3 seconds of change in said RCOUNT.

* * * * *